United States Patent [19]
Muyskens et al.

[11] Patent Number: 5,409,337
[45] Date of Patent: Apr. 25, 1995

[54] RETAINED SEAL ASSEMBLY

[75] Inventors: Dale E. Muyskens, Vicksburg; Patrick L. Brown, Battle Creek, both of Mich.; Eugene S. Mazurek, Shelbyville, Ind.

[73] Assignee: Eaton Corporation, Cleveland, Ohio

[21] Appl. No.: 116,110

[22] Filed: Sep. 2, 1993

[51] Int. Cl.6 .................... F16B 39/24; F16B 43/02
[52] U.S. Cl. ................................ 411/148; 411/542; 411/902
[58] Field of Search ............... 411/112, 134, 136, 148, 411/542, 902, 907, 915, 369, 371

[56] References Cited

U.S. PATENT DOCUMENTS

| | | | |
|---|---|---|---|
| 2,343,235 | 2/1944 | Bashark | 411/542 |
| 3,286,577 | 11/1966 | Weidner | 411/542 |
| 3,316,952 | 5/1967 | Hollinger | 411/542 |
| 3,482,864 | 12/1969 | Bynum | 411/915 |
| 3,519,279 | 7/1970 | Wagner | 411/542 |
| 5,165,834 | 11/1992 | Takenouchi | 411/542 |

FOREIGN PATENT DOCUMENTS 691842 7/1965 Italy .................... 411/369

Primary Examiner—Flemming Saether
Attorney, Agent, or Firm—L. J. Kasper; Howard D. Gordon

[57] ABSTRACT

A seal assembly (21) is disclosed for use with a housing (H) which defines a fluid chamber (C) and a threaded opening (O). In threaded engagement with the opening is a threaded portion (13) of a device such as a sensor assembly (11). The housing defines a counterbore (CB) disposed axially between the threaded opening (O) and an external surface (S). The seal assembly (21) includes a metal support member (23) including a cylindrical portion (27) having inner (33) and outer (35) portions of elastomeric sealing material. The seal assembly is pressed into the counterbore and, by means of the interference fit therebetween, may be permanently retained therein. As the member is threaded into the opening, the underside (16) of the head (15) deforms a sealing lip (39) radially inward into engagement with the threaded portion (13). As a result, the threaded member may be removed and replaced by another, without loss of sealing function, and without the need to replace the conventional, prior art O-ring seal which would normally be retained on the threaded member.

8 Claims, 4 Drawing Sheets

PRIOR ART FIG. 1

RETAINED SEAL ASSEMBLY

BACKGROUND OF THE DISCLOSURE

The present invention relates to the sealing art, and more particularly, to devices of the type in which a member is in threaded engagement with a threaded opening formed in a housing which contains fluid, which must be retained within the housing.

Although the sealing arrangement of the present invention is adapted for use in many types of devices, it is especially suited for use with mechanical devices such as vehicle transmissions, and will be described in connection therewith. On vehicle transmissions, there is frequently a need to install a threaded member, such as a speedometer sensor, into threaded engagement with the housing of the transmission. If the device contains fluid, such as water or lubricant oil, it is necessary to provide a sealing arrangement around the threaded member, in order to prevent leakage of the fluid from within the housing of the device to the exterior thereof. The invention is applicable to devices wherein the fluid within the housing is at substantially atmospheric pressure, as well as to devices wherein the fluid is typically at a positive pressure.

In some such applications, any one of a number of well known gasket designs may be sufficient, but in various other applications, the use of a gasket is not practical. As is well known to those skilled in the art, a typical gasket design requires that there be a fairly large clamping or sealing area between two members. Therefore, the present invention is especially suited for applications in which the member being sealed (e.g., a threaded speedometer sensor) does not provide sufficient clamping area between itself and the adjacent member (e.g., the transmission housing) to permit the use of a conventional gasket assembly.

In such applications, it has been conventional to install an O-ring at the junction of the threaded portion and the head of the threaded member, such that the O-ring remains with that particular threaded member. In some applications, the use of such an O-ring is acceptable, but in various other applications, where the threaded member is occasionally replaced, the use of an O-ring which remains with the threaded member is not acceptable, because if the O-ring is not transferred to the replacement threaded member, or a new O-ring is not provided with the new threaded member, the result will be a loss of satisfactory sealing.

SUMMARY OF THE INVENTION

Accordingly, it is an object of the present invention to provide an improved sealing arrangement for use in a device of the type described above which overcomes the noted deficiencies of the prior art.

It is a more specific object of the present invention to provide such a sealing arrangement which remains with the housing of the device, and is retained therein, rather than being removed with the threaded member which is being replaced.

The above and other objects of the invention are accomplished by the provision of an improved sealing assembly for a device of the type including housing means defining a fluid chamber adapted to contain fluid. The housing means defines a threaded opening adapted to provide fluid communication between the fluid chamber and the exterior of the housing means. A member is operably associated with the housing means and includes a threaded portion in threaded engagement with the threaded opening, the threaded portion defining a nominal diameter (D1). The member further includes an enlarged portion extending beyond the nominal diameter (D1), the enlarged portion having an underside disposed adjacent an exterior surface of the housing means, and surrounding the threaded opening. Sealing means is disposed between the threaded opening and the threaded portion, and is adapted to prevent communication of fluid between the fluid chamber and the exterior of the housing means.

The improved seal assembly is characterized by the threaded opening defining a seal receiving portion disposed adjacent the exterior surface of the housing means. The sealing means comprises a generally annular, rigid support member including a generally cylindrical portion disposed within the seal receiving portion. An elastomeric sealing material is disposed about at least a major portion of the rigid support member, including both an inner portion and an outer portion disposed about the generally cylindrical portion, the sealing material disposed about the inner portion defining a diameter (D2) greater than nominal diameter (D1). The elastomeric sealing material includes a sealing portion in sealing engagement with the underside of the enlarged portion, and with the threaded portion of the member.

In accordance with a further aspect of the present invention, the seal receiving portion comprises a counterbore having a diameter (D3) greater than the nominal diameter (D1), but less than a diameter (D4) defined by the elastomeric sealing material outer portion disposed about the generally cylindrical portion, the counterbore being disposed axially between the threaded opening and the exterior surface of the housing means.

DESCRIPTION OF THE PREFERRED EMBODIMENTS

Figure 1:
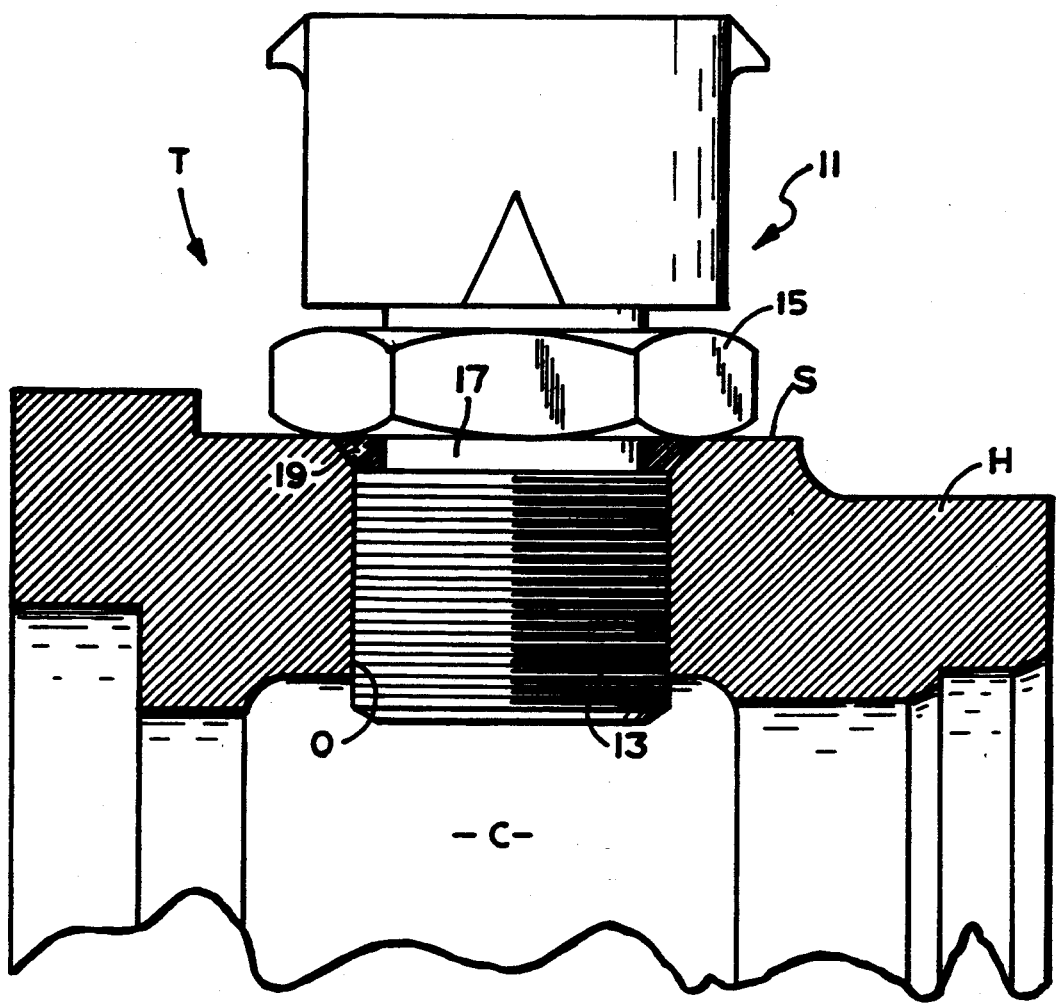
FIG. 1 is a fragmentary view in axial cross-section, illustrating a device of the type with which the present invention may be utilized, but made in accordance with the prior aft.

Referring now to the drawings, which are not intended to limit the invention, FIG. 1 illustrates, in somewhat pictorial form, a device with which the present invention may be utilized. In FIG. 1, the device comprises a portion of a vehicle transmission, generally designated T, which is shown partly broken away in FIG. 1 to illustrate that the transmission T includes a housing H within which is defined a fluid chamber C. The housing H defines a threaded opening O through which fluid could be (but is not supposed to be) communicated from the fluid chamber C to the exterior of the transmission T.

In the subject embodiment of FIG. 1, the threaded opening O is included to permit the insertion, within the housing H, of a speedometer sensor assembly, generally designated 11, which is illustrated only fragmentarily in FIG. 1. The sensor assembly 11 includes a threaded portion 13, which is in threaded engagement with the opening O, and a hexagonal head 15, by means of which the sensor assembly 11 may be rotated, either to loosen or tighten the threaded engagement within the opening O. Typically, the sensor assembly 11 is turned into tighter threaded engagement until an underside 16 of the hexagonal head 15 engages an exterior surface S of the housing H.

The threaded portion 13 of the sensor assembly 11 includes a reduced diameter portion 17, and, as is well known to those skilled in the art, the typical prior art sealing arrangement would comprise an O-ring 19 disposed about the reduced diameter portion 17. The O-ring 19 (called an "O-ring" because it has a circular cross-section at rest) is deformed into the configuration shown in FIG. 1 as the sensor assembly 11 is threaded into tight engagement with a chamfered portion of the housing H. As was explained in the BACKGROUND OF THE DISCLOSURE, removal of the sensor assembly 11 would, of necessity, involve removal of the O-ring 19, which would remain in place about the reduced diameter portion 17.

Figure 2:
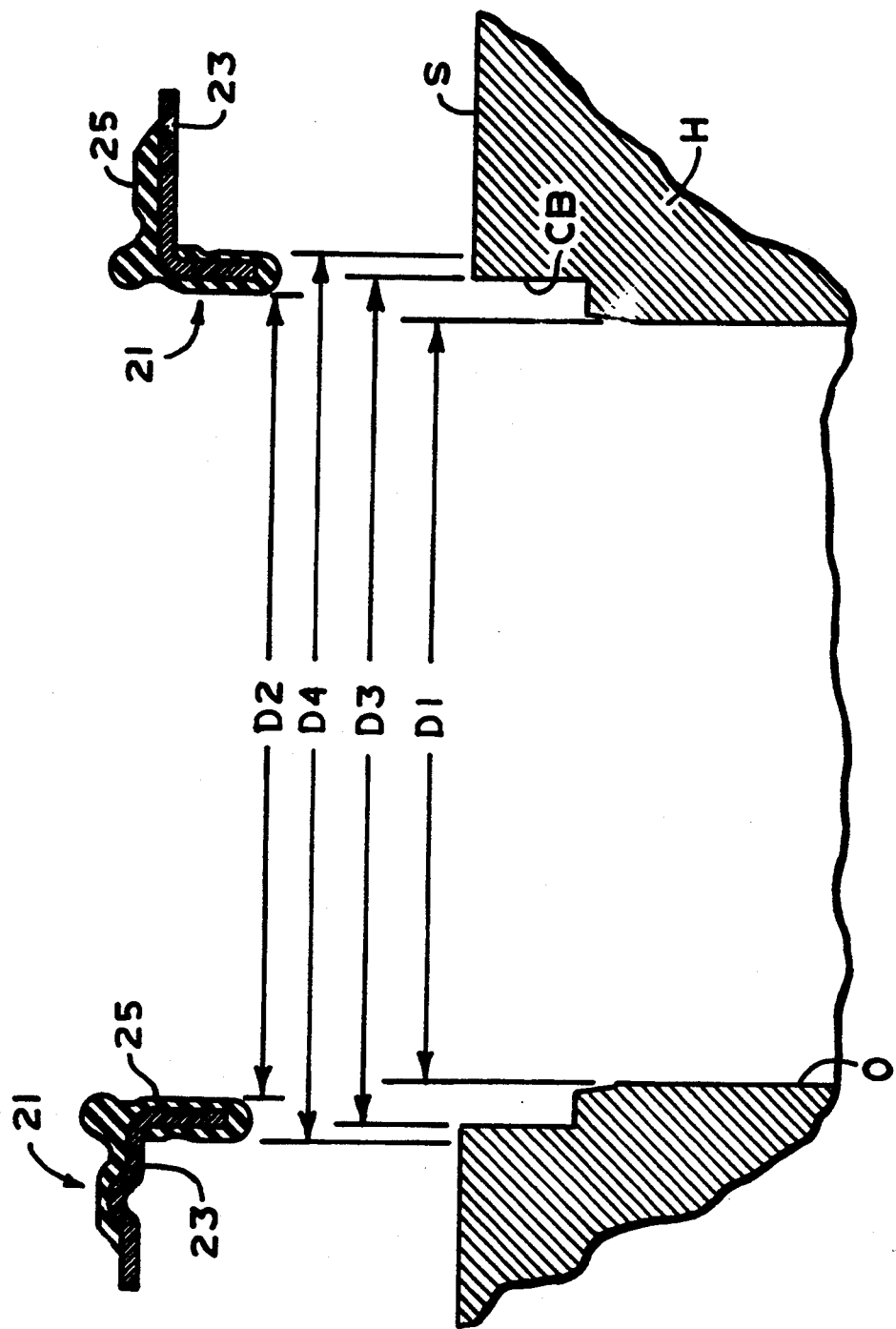
FIG. 2 is an enlarged cross-section of the seal assembly of the present invention, prior to assembly with the housing of the device.

Referring now primarily to FIG. 2, the improved sealing arrangement of the present invention is illustrated, disposed "above" the housing H, prior to assembly therein. A primary purpose of FIG. 2 is to illustrate certain important spatial or dimensional relationships between the housing H and the seal assembly of the present invention.

The threaded opening O of the housing H defines a diameter (D1) which corresponds to the diameter of the threaded portion 13 of the sensor assembly 11. For ease of explanation, and not by way of limitation, the diameter (D1) may be considered the major diameter of the threaded opening O. Disposed axially between the threaded opening O and the exterior surface S, the housing H defines a counterbore CB which defines a diameter (D3). The presence of the counterbore CB is the only difference required for the housing H, in connection with the use of the present invention. The counterbore CB is merely a simple, cylindrical counterbore, preferably having a relatively smooth, machined surface, but not requiring any sort of ribs or projections, or any other form of "retaining means", as will be described subsequently. Typically, the diameter tolerance for the counterbore CB, in order to use the present invention, will need to be maintained within fairly narrow limits (e.g., +0.0020 inches).

Figure 4:
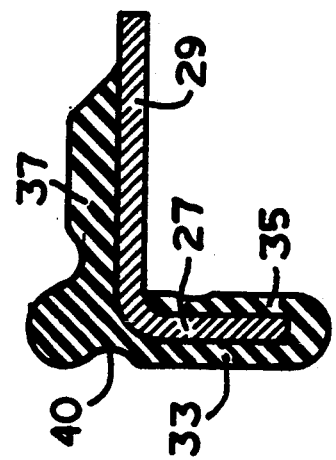
FIG. 4 is an axial cross-section of the seal assembly of the present invention, on the same as FIG. 3, but taken on a different plane.
Figure 3:
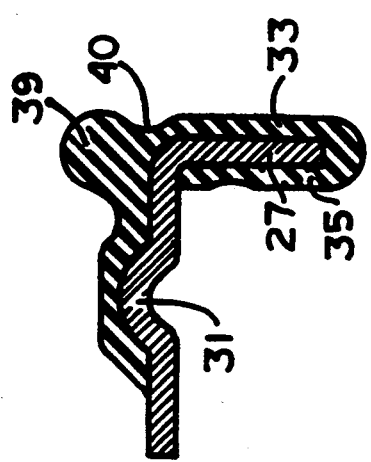
FIG. 3 is a further enlarged, axial cross-section through one portion of the seal assembly of the present invention.

Referring now to FIGS. 3 and 4, in conjunction with FIG. 2, the improved seal assembly, generally designated 21, will be described in some detail. The seal assembly 21 comprises a continuous, annular assembly including a stamped metal support member 23 having molded thereto an elastomeric sealing material, generally designated 25.

The support member 23 comprises a generally cylindrical portion 27, and a flat annular portion 29. Although the portion 29 was referred to as being "flat" (as in the section shown in FIG. 4), it should be noted that at various circumferential locations (as shown in FIG. 3), the annular portion 29 includes a raised rib 31, the function of which will be described subsequently.

Referring still to FIGS. 2 through 4, the elastomeric sealing material 25 preferably comprises a single element, molded in place about the support member 23, to provide greater overall structural integrity for the sealing material 25.

In the preferred embodiment shown herein, the sealing material 25 includes four primary portions, as follows:

1. A portion 33, disposed within the inside diameter of the cylindrical portion 27;
2. A portion 35, disposed about the outside diameter of the cylindrical portion 27;
3. A portion 47, disposed on top of the flat, annular portion 29; and
4. A sealing lip 39, defining an undercut 40.

In the subject embodiment, and for reasons which will become apparent subsequently, the sealing lip 39 extends generally upward and radially inward when the seal assembly 21 is in the free state as shown in FIGS. 2 through 4. Also in the subject embodiment, the elastomeric sealing material 25 preferably comprises a fluoro-elastomer, and specifically, one sold under the trademark VITON ® because the fluid within the chamber C may reach temperatures of approximately 300° F. In the absence of any particular material requirement such as that noted above, the elastomeric sealing material 25 may comprise any sort of appropriate sealing material which is suitable for the particular device and sealing applications (i.e., oil versus water; high temperature versus low temperature, etc.).

Referring again primarily to FIG. 2, with the seal assembly 21 in the "free state", as shown in FIG. 2 prior to assembly, the portion 33 of the sealing material 25 which comprises the I.D. of the seal defines a diameter (D2). The diameter (D2) must be greater than the diameter (D1), so that, after the seal assembly 21 is inserted in the housing H, the threaded portion 13 may then be threaded into the opening O without engaging the I.D. portion 33.

The portion 35 of the sealing material 25 which is disposed about the outside diameter defines a diameter (D4). The diameter (D4) is greater than the diameter (D3) of the counterbore CB, such that installation of the seal assembly 21 within the counterbore CB requires an interference fit. In the subject embodiment, the diametral difference between the portion 35 and the counterbore CB is in the range of about 0.007 inches to about 0.018 inches. It should be understood by those skilled in the art that the interference fit relationship described herein is by way of example only, and the particular interference fit dimensions which are appropriate in any given application will depend of factors such as the absolute diameters involved, the durometer of the elastomeric sealing material 25, and the exact configuration of the seal assembly 21 and counterbore CB. In the subject embodiment, the amount of interference-fit selected, and subsequently found to be successful, was such that the seal assembly 21 could be inserted within the counterbore CB by hand, i.e., by means of a "thumb press" of about 20 lbs. force, without the need for any sort of mechanized press-in operation.

Figure 5:
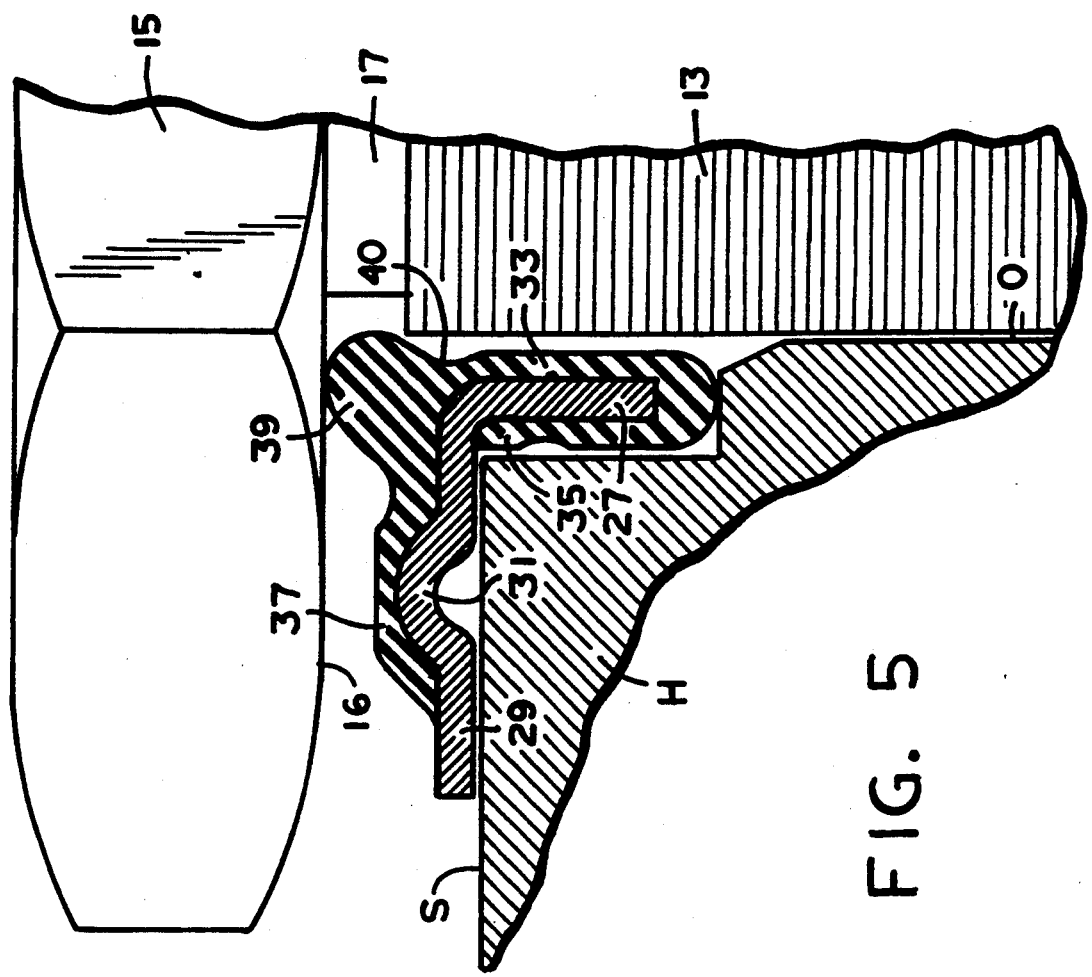
FIG. 5 is a fragmentary section similar to FIG. 1, illustrating insertion of the threaded member and a further aspect of the present invention.

Referring now primarily to FIG. 5, after the seal assembly 21 has been pressed or inserted into the counterbore CB, the only remaining step is to insert the sensor assembly 11, by threading the threaded portion 13 into the threaded opening O. As this threaded engagement continues, the hexagonal head 15 begins to engage the "top" portion of the sealing lip 39 (the position illustrated in FIG. 5). With further tightening of the threaded portion 13 into the opening O, several things occur. First, because of the orientation of the sealing lip 39, continued downward movement of the hexagonal head 15 forces the sealing lip 39 radially inward until it is eventually in tight sealing engagement about the reduced diameter portion 17 (which, for purposes of this aspect of the present invention, will be considered part of the threaded portion 13). Secondly, as the head 15 moves downward from the position shown in FIG. 5, it eventually engages the portion 37 of the sealing material 25 and begins to compress it, until the portion 37 becomes relatively thin. At that point, the raised ribs 31 of the support member 23 prevent any further downward movement of the head 15. In other words, the raised ribs 31 serve as a positive stop, limiting the downward movement of the head 15 at a position in which the sealing lip 39 is compressed to an extent sufficient to provide whatever level of sealing is desired. If the fluid within the chamber C is at substantially atmospheric pressure, less compression of the sealing lip 39 is required. On the other hand, if the fluid within the chamber C is at some positive pressure, for example, 10 psi, somewhat greater compression of the sealing lip 39 may be required to prevent leakage of the fluid.

It will be appreciated by those skilled in the art that, as the head 15 moves downward in FIG. 5, compressing the sealing lip 39, the portions 33 and 35 are also forced downward within the counterbore CB, but the inner portion 33 is not forced into sealing engagement around the adjacent outside surface of the threaded portion 13. Instead, there should still be a gap or clearance therebetween so that the sensor assembly 11 can be removed subsequently, without causing removal of the seal assembly 21.

As was noted above, one important aspect of the present invention is the hinge-like movement of the sealing lip 39. It has been found in connection with the development of the present invention, that the radial depth of the undercut 40 is preferably about one-half of the radius of the sealing lip 39. Therefore, in the subject embodiment, the undercut 40 has a radial depth of about 0.010 inches, while the sealing lip has a radius of about 0.020 inches.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

I claim:

1. In a device of the type including housing means defining a fluid chamber adapted to contain fluid; said housing means defining a threaded opening adapted to provide fluid communication between said fluid chamber and the exterior of said housing means; a member operably associated with said housing means and including a threaded portion in threaded engagement with said threaded opening, said threaded portion defining a nominal diameter, and said member further including an enlarged portion extending beyond said nominal diameter, said enlarged portion having an underside disposed adjacent an exterior surface of said housing means and surrounding said threaded opening; and sealing means disposed between said threaded opening and said threaded portion, and adapted to prevent communication of fluid between said fluid chamber and the exterior of said housing means; characterized by:
   (a) said threaded opening defining a seal receiving portion disposed adjacent said exterior surface of said housing means;
   (b) said sealing means comprising a generally annular, rigid support member including a generally cylindrical portion disposed within said seal receiving portion;
   (c) an elastomeric sealing material disposed about at least a major portion of said rigid support member, including both an inner portion and an outer portion disposed about said generally cylindrical portion, said sealing material disposed about said inner portion defining a diameter greater than said nominal diameter;
   (d) said elastomeric sealing material including a sealing portion in sealing engagement with said underside of said enlarged portion, and with said threaded portion of said member; and
   (e) said seal receiving portion comprising a counterbore having a diameter greater than said nominal diameter, but less than a diameter defined by said elastomeric sealing material outer portion disposed about said generally cylindrical portion, said counterbore being disposed axially between said threaded opening and said exterior surface of said housing means.

2. A device as claimed in claim 1, characterized by said generally annular, rigid support member comprising a stamped, metal member, press-fit into said counterbore.

3. A device as claimed in claim 1, characterized by said generally annular, rigid support member has a generally L-shaped cross-section including said generally cylindrical portion and an integrally-formed, flat, annular portion oriented generally parallel to said exterior surface of said housing means.

4. A device as claimed in claim 3, characterized by said flat, annular portion includes stop means operable to limit the axial travel of said member as said threaded portion is threaded into said threaded opening.

5. A device as claimed in claim 4, characterized by said elastomeric sealing material including an annular portion disposed axially between said flat, annular portion of said support member and said underside of said enlarged portion.

6. A device as claimed in claim 5, characterized by said annular portion of said elastomeric sealing material and said sealing portion being formed integrally with each other over substantially the entire circumference of said sealing portion.

7. A device as claimed in claim 1, characterized by said elastomeric sealing material outer portion being sized such that said generally cylindrical portion of said support member is retained within said seal receiving portion, whereby removal of said member from threaded engagement with said threaded opening does not result in removal of said sealing means from said seal receiving portion.

8. A device as claimed in claim 1, characterized by said sealing portion comprises an annular, pivotable, sealing lip adapted to engage said underside of said enlarged portion while said member is being threaded into said threaded opening, and be deformed radially inward thereby.

* * * * *